United States Patent [19]

Cottis et al.

[11] Patent Number: 4,563,508

[45] Date of Patent: Jan. 7, 1986

[54] INJECTION MOLDABLE AROMATIC POLYESTERS COMPOSITIONS AND METHOD OF PREPARATION

[75] Inventors: Steve G. Cottis, Fort Wright, Ky.; Richard Layton, New City, N.Y.; Nathan D. Field, Wyckoff, N.J.

[73] Assignee: Dart Industries, Inc., Northbrook, Ill.

[21] Appl. No.: 611,806

[22] Filed: May 18, 1984

[51] Int. Cl.[4] .................. C08L 67/02; C08L 67/04
[52] U.S. Cl. .................... 525/444; 524/451; 524/601; 524/604; 524/605; 525/450
[58] Field of Search ............... 525/444, 450; 524/601, 524/604, 605, 451

[56] References Cited

U.S. PATENT DOCUMENTS

| | | | |
|---|---|---|---|
| 4,250,281 | 2/1981 | Riecke | 525/444 |
| 4,267,289 | 5/1981 | Froix | 525/444 |
| 4,408,022 | 10/1983 | Cincotta et al. | 525/444 |
| 4,414,365 | 11/1983 | Sugimoto et al. | 525/444 |
| 4,433,083 | 2/1984 | Cogswell et al. | 525/444 |

Primary Examiner—Lester L. Lee
Attorney, Agent, or Firm—Jones & Askew

[57] ABSTRACT

The molding properties of molding compounds based on wholly aromatic polyesters are improved by the addition to such wholly aromatic polyester compositions of a minor amount of an aromatic polyester which is a combination of the following units:

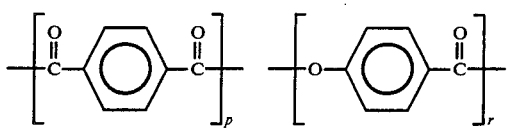

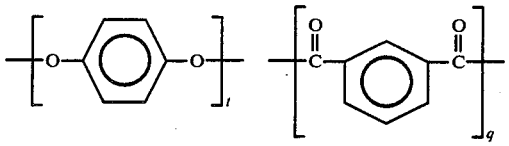

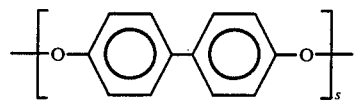

Where; $p=0$ to $0.9$, $q=0.1$ to $1.00$, $r=1$ to $7$, $S=0.3$ to $1.00$, $t=0$ to $0.7$. A preferred formulation consists of a polyester where the units are: $p=0$, $q=1.0$, $r=1$ to $5$ and $S=1.0$.

20 Claims, No Drawings

INJECTION MOLDABLE AROMATIC POLYESTERS COMPOSITIONS AND METHOD OF PREPARATION

BACKGROUND OF THE INVENTION

It is known that wholly aromatic esters are suitable for use in molding compositions. The synthesis of wholly aromatic polyesters of the type with which the present invention is principally concerned is disclosed in U.S. Pat. No. 3,637,595, entitled, "p-Oxybenzoyl Copolyester", the disclosure of which is incorporated herein by reference. Other patents disclosing the molding properties of aromatic polyesters, more particularly of oxybenzoyl polyesters are U.S. Pat. Nos. 3,662,052, 3,849,362 and 4,219,629.

Another group of aromatic polyesters which can be employed are the aromatic polyesters containing recurring units of the 2,6-dicarboxynaphthalene moiety and/or the p-oxybenzoyl moiety and symmetrical dioxy aryl moiety, and variations thereof. Such polyesters are disclosed in U.S. Pat. Nos. 4,067,852; 4,083,829; 4,130,545; 4,161,470; 4,184,996; 4,219,461; 4,224,433, 4,238,598; 4,238,599; 4,256,624; 4,265,802; 4,279,803, 4,318,841 and 4,318,842.

The oxybenzoyl polyesters useful in the present invention can be employed with various fillers of types and in amounts which either promote or at a minimum do not materially affect the desired properties. Examples of suitable fillers include among others glass fibers, milled glass, polytetrafluoroethylene, pigments and talc and known conventional fillers and combinations thereof.

In a particular application of molding compositions based on oxybenzoyl polyesters, novel ovenware which can be used in both thermal and microwave ovens has been provided as described in copending and commonly assigned application Ser. No. 450,949, now abandoned, entitled "Plastic Ovenware", the disclosure of which is incorporated herein by reference.

A further improvement in the production of such ovenware wherein talc of a particular quality is employed as a filler is disclosed in copending and commonly assigned application Ser. No. 401765, entitled "Improved Plastic Ovenware Containing Talc", the disclosure of which is likewise incorporated herein by reference.

Continuing effort continues to be expended on the development of more effective molding compositions and improvements in the molding procedure.

SUMMARY OF THE PRESENT INVENTION

It has been found in accordance with the present invention that better molding characteristics and better processability can be imparted to a wholly aromatic polyester, particularly an oxybenzoyl polyester, by incorporating therein a minor amount of an oxybenzoyl polyester of a particular composition.

While the present invention is generally applicable to all of the resins described in the copending applications referred to above, it is particularly directed to the resin in which the dibasic acid moiety, the hydroxy aromatic acid moiety and the aromatic diol are derived respectively from terephthalic acid, p-hydroxybenzoic acid and biphenol present in the molar proportions of about 1:2:1. Other molar proportions can be employed and resins have been employed in molding compositions in which the respective molar proportions are 1:3:1, 1:5:1, 1:7:1, 1:3.5:1 and 1:1:1.

All of the resins described in the above paragraph are improved in their flow properties by the incorporation there of a minor amount of a resin in which the terephthalic acid reactant has been wholly or partially replaced by isophthalic acid. The resulting resins which have been found to be effective as flow modifiers are combinations of the following units:

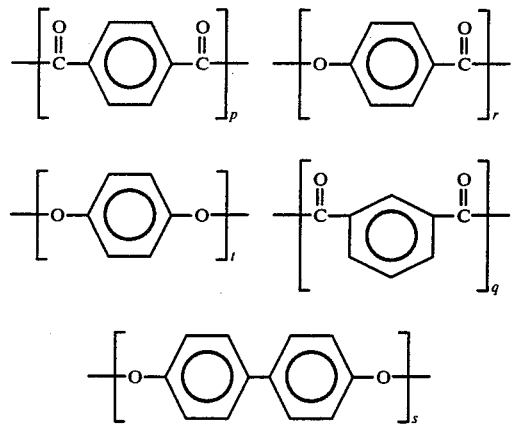

Where; $p=0$ to 0.9, $q=0.1$ to 1.00, $r=1$ to 7, $S=0.3$ to 1.00 $t=0$ to 0.7. A preferred formulation consists of a polyester where the units are: $p=0$, $q=1.0$, $r=1$ to 5 and $S=1.0$.

It has also been found that all or part of the biphenol reactant can be replaced by hydroquinone when isophthalic acid is the dibasic acid reactant to yield a flow modifier.

The proportions of p-hydroxybenzoic acid can be varied.

The flow modifiers have melting points above about 250° C. and do not adversely affect the thermal stability of the final resin blend nor do they alter the color or the color stability in the final molded product.

They can be added to the base molding resin compound in minor amount, illustratively of from about 1% to about 20% and preferably, of from about 2 to about 10%.

The composition of the present invention can be prepared by extrusion in accordance with generally known practice. For example, a twin screw extruder with a vent having vacuum capability can be employed with addition of the polymer, selected talc and titanium dioxide at the feed throat.

The compositions so prepared can then be injection molded according to general practice using techniques familiar to the injection molding field.

The invention is further illustrated by the following examples in which all parts and percentages are by weight unless otherwise indicated. These nonlimiting examples are illustrative of certain embodiments designed to teach those skilled in the art how to practice the invention and to represent the best mode contemplated for carrying out the invention.

The term MF (Melt Flow) as used in this application is defined in ASTM D1238 as the rate of extrusion in grams/10 mins of the material. The conditions under which the compounds described in this present application are tested is to pass the material through an 0.0825 inch diameter orifice which is 0.315 inch in length under a 38 lb. load at 410° C.

The term Compressive Flow (CF) as used in this application is a measure of the flow of a weighed sample when pressed on a Carver press at 5000 pounds. It is measured from the area of a disc obtained from a sample of powdered material of given weight, usually 0.5 to 1.0 grams which has been pressed between two parallel plates. In carrying out the determination of this characteristic, a sample is pressed between two sheets of aluminum foil which in turn are backed by chromium plated steel plates 6"×6"×¼". A Carver 2112-X Model No. 150-C hydraulic press modified for 800° F. is used to press the sample. The particular temperature of the press is that indicated in each sample run. The sample material is allowed to stand for five minutes between the plates at holding pressure in order that the temperature of the material can equilibrate with the press temperature. A load of 5000 pounds is then applied for two minutes. The CF is then calculated on the following basis. The area of the pressed molding compound is measured by cutting an aluminum sandwich out of the sample pressed between the two aluminum foil sheets. The aluminum foil has a known area/weight relationship called the foil factor. The area is normalized for the pressure of the applied load and that number is multiplied by 100 to give a number greater than 1. The compressive flow is then calculated by means of the following equation:

$$CF = \left[ \frac{\left| \frac{\text{Wt. of circle (sandwich)} - \text{wt. of sample}}{\text{Foil wt. factor}} \times 50 \right|^2}{\text{Applied load (Kg)} \times \text{wt. of sample}} \right] \times 100$$

EXAMPLE 1

This example illustrates the synthesis of a copolyester useful as the base molding resin in the present invention.

268 parts of biphenol, 396 parts of parahydroxybenzoic acid, 693.40 parts of acetic anhydride and 238 parts of terephthalic acid are admixed and heated to a temperature of 315° C. over a period of 5 hours. The reaction mixture is stirred throughout the heating period. When the temperature of 315° C. is reached, the polymer contents are removed from the reaction vessel and ground to a particle size in the 20 to 200 mesh range, U.S. Standard Sieve Series. The resin particles are incrementally advanced in an oven to a temperature of 354° C. over a period of 16 hours and recovered as a granular powder.

EXAMPLE 2

A molding composition was prepared from the polymer of Example 1 by extruding on a twin screw extruder equipped with vacuum (pressure 100-150 mm Hg) a mixture of 257.5 parts of the polymer of Example 1, 30 parts of rutile titanium dioxide and 212.5 parts of a high purity talc having the platy structure of natural talc, a loss on ignition of 2% weight percent, an iron content analyzed as $Fe_2O_3$ of 0.5% and a particle size distribution in which over 95% of the particles are less than 40 microns.

EXAMPLE 3

956 parts of biphenol, 1411 parts of parahydroxybenzoic acid, 2449 parts of acetic anhydride, 743 parts of terephthalic acid, and 106 parts isophthalic acid are admixed and heated to a temperature of 295° C. over a period of 5 hours at a 30° C. per hour rate of rise for the temperature. The reaction mixture is stirred throughout the heating period. When the temperature of 295° C. is reached, the polymer contents are removed from the reaction vessel, cooled, and ground to a particle size in the 20 to 200 mesh range, U.S. Standard Sieve Series. The resin particles are then incrementally advanced in an oven to a temperature of 366° C. over a period of 11 hours and held for 1 hour and recovered as a granular powder, CF=58 at 404° C.

EXAMPLE 4

699 parts of biphenol, 1913 parts of parahydroxybenzoic acid, 2573 parts of acetic anhydride and 620 parts of isophthalic acid are admixed and heated to a temperature of 304° C. over a period of 5 hours at a 30° C. per hour rate of rise for the temperature. The reaction mixture is stirred throughout the heating period. When the temperature of 300° C. is reached, the melt is poured into a two arm mechanical mixer and mixed at 324° C. for 4 hours. On cooling, the melt converts to a solid having a CF=217 @ 270° C. and an inherent viscosity (IV) of 0.85 (0.1% in pentafluorophenol).

EXAMPLE 5

699 parts of biphenol, 1913 parts of parahydroxybenzoic acid, 2573 parts of acetic anhydride, 620 parts of isophthalic acid, and 2.1 parts $Mg(OAc)_2.4H_2O$ are admixed and heated to a temperature of 255° C. over a period of 3 hours at a 35° C. per hour rate of rise for the temperature. The reaction mixture is stirred throughout the heating period and maintained at 255°-265° C. for another hour. The melt is then poured into a two arm mechanical mixer and mixed at 260° C. for 4 hours. On cooling, the melt changes to a solid with a CF=64 @ 270° C. and IV=1.0.

The following examples illustrate the use of the flow modifier resin to impart superior flow characteristics to the base oxybenzoyl polyester molding compound.

EXAMPLE 6

The copolymer of Example 3, CF=58, was mixed in powder form with pellets of the molding composition of Example 2 in a ratio of 5 parts of the resin of Example 3 to 95 parts of the composition of Example 2. The resulting mixture was molded against a control comprising the unmodified composition of Example 2. The molding conditions and corresponding stock temperatures are listed as follows:

| | Zone I | Zone II | Zone III | Zone IV | Mold | Stock Temp. |
|---|---|---|---|---|---|---|
| Control | 355° C. | 360° C. | 350° C. | 350° C. | 230° C. | 424° C. |
| Modified Composition | 355° C. | 360° C. | 350° C. | 350° C. | 230° C. | 419° C. |

The stock temperature was reduced 5° C. by the additive thus demonstrating the better flow characteristics of the modified composition.

EXAMPLE 7

A blend of 50% Polytal 4545 talc from Whitaker, Clark & Daniel and 50% of a resin prepared in accordance with Example 5 from isophthalic acid, p-hydroxybenzoic acid and biphenol in a molar ratio of 1 to 3.71 to 1.00 were compounded on a single screw extruder and recovered as pellets.

A blend of 4% of the resin thus prepared and 96% of the pellets of the composition of Example 2 were molded against a control comprising the unmodified composition of Example 2. The molding conditions and corresponding stock temperatures are listed as follows:

|  | Zone I | Zone II | Zone III | Zone IV | Mold | Stock Temp. |
| --- | --- | --- | --- | --- | --- | --- |
| Control | 360° C. | 365° C. | 355° C. | 355° C. | 250° C. | 424° C. |
| Modified Composition | 360° C. | 365° C. | 355° C. | 355° C. | 250° C. | 408° C. |

The blend, modified composition molded with less torque and the molded parts had better gloss and showed less sticking during the molding than the control. The stock temperature was lowered by 16° C.

EXAMPLE 8

A. A flow modifier resin was prepared in accordance with the procedure of Example 3 from isophthalic acid, parahydroxy benzoic acid and biphenol in the molar ratio of 1 to 3.71 to 1.005. 10% of this resin was compounded with 42% of Polytal 4545, 8% of rutile titanium dioxide and 40% of the resin of Example 2.

B. A molding composition was prepared by compounding 50% of the resin of Example 1 with 42% of Polytal 4545 and 8% of rutile titanium dioxide.

Mixtures of the foregoing compositions A and B were blended in the proportions set out in the Table below and extruded into pellets on a one inch Killion extruder. The ease of extrusion and the melt flow (MF) properties listed in the table demonstrate the effectiveness of the flow modifier.

| Percent B | Percent A | Killion amps | Extruded Pellet Blend CF | MF |
| --- | --- | --- | --- | --- |
| 100 | 0 | 6.3 | 34 | 0 |
| 96 | 4 | 5.6 | 42 | 0.15 |
| 93 | 7 | 4.4 | 45 | 0.21 |
| 90 | 10 | 3.2 | 52 | 0.41 |
| 87 | 13 | 2.8 | 57 | 3.1 |

Both the compressive flow (CF) and the melt flow (MF) of the extruded pellets increase as the amount of high flow material is increased.

EXAMPLES 9 AND 10

The following examples illustrate the use of the flow modifier resin to increase the level of filler that can be combined with the base oxybenzoyl molding resin without adversely affecting the properties of parts molded from such highly filled molding resins.

EXAMPLE 9

A 70% filler containing blend of 1300 parts of oven dried Potters E-3000 glass beads, 100 parts rutile TiO$_2$, 560 parts of base oxybenzoyl polyester described in Example 1 and 40 parts of flow modifier described in Example 5 was extruded on a 1" Killion extruder with Zones (Feed) 1, 2 and 3 set at 620° F., 720° F. and 740° F., respectively. At 30 RPM the ammeter recorded only 3-4 amps (an empty extrusion draws about ½ amp.) Under these conditions a light grey/beige fuse ribbon (no die) was extruded. The ribbon was chipped and the resulting chips injection molded on a 30 ton Newbury machine. Trays measuring 3×3 inches by 73 mils thick were molded, had Dynatup impact strengths of 0.74 ft-lb, were blister resistant at 500° F. and showed improved scratch resistance and hardness over trays made with molding compounds containing less than 42% of beads. It was not possible to compound (extrude) similar compositions using the same oxybenzoyl polyester resin, TiO$_2$ and E glass in formulations greater than 50% filler content without the flow modifier disclosed herein.

EXAMPLE 10

Using a 83 mm "ZSK" twin screw extruder equipped with vacuum, the following blends were extruded at a rate of 300 lb/hr and at 125 RPM:

BLEND I (50% Level)—50 parts resin as described in Example 1, 45.5 parts polytal 4545 talc and 4.5 parts rutile TiO$_2$.

BLEND II (60% Level)—38 parts resin as described in Example 1, 2 parts flow modifier as described in Example 5, 55 parts Polytal 4545 talc and 5 parts rutile TiO$_2$.

BLEND II even though containing 10% more filler extruded at a markedly lower torque than did Blend I containing no flow modifier.

The extruded pellets showed the following flow properties:

| PROPERTIES | BLEND I (50%) | BLEND II (60%) |
| --- | --- | --- |
| Melt Flow @ 410° C. (770° F.) | 0.27 | 0.52 |

These blends were molded into ASTM test specimens and 10"×5" trays on a Windsor 180 ton machine. Blend II, even though higher filled, molded with less torque and with 10° C. lower measured stock temperatures than Blend I, which contained no flow modifier. The resulting physical properties were completely acceptable.

The ratios used in the foregoing examples and in the claim are mole ratios.

What is claimed is:

1. In the process of molding articles comprising aromatic oxybenzoyl polyesters the improvement which comprises adding to the aromatic oxybenzoyl polyester composition a minor amount of a different polymeric flow modifier comprising combinations of the following units

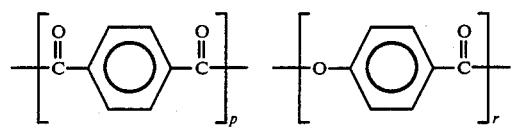

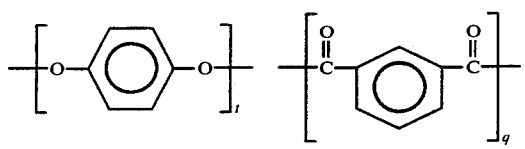

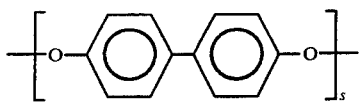

Where; p=0 to 0.9, q=0.1 to 1.00, r=1 to 7, s=0.3 to 1.00, and t=0 to 0.7.

2. The process of claim 1 wherein the ratio of the units in the formula is p=0, q=1.0, r=1 to 5 and s=1.0.

3. The process of claim 1 wherein the flow modifier is present in an amount of from about 1% to about 20%.

4. The process of claim 1 wherein the flow modifier is present in an amount of from about 2% to about 10%.

5. The process of claim 1 wherein the aromatic oxybenzoyl polyester is a polyester prepared by the reaction of terephthalic acid, p-hydroxybenzoic acid and biphenol.

6. The process of claim 1 wherein the aromatic oxybenzoyl polyester flow modifier is a polyester prepared by the reaction of isophthalic acid p-hydroxybenzoic acid and biphenol.

7. The process of claim 1 wherein the aromatic oxybenzoyl polyester is a polyester prepared by the reaction of a mixture of isophthalic and terephthalic acids, p-hydroxybenzoic acid and biphenol.

8. The process of claim 5 wherein the terephthalic acid, p-hydroxybenzoic acid and biphenol are present in the respective ratios 1:0.1:1 to 1:15:1.

9. The process of claim 5 wherein the terephthalic acid, p-hydroxybenzoic acid and biphenol are present in the ratio of 1:2:1.

10. A composition which is capable of forming shaped articles comprising a minor amount of a polymeric flow modifier comprising combinations of the following units

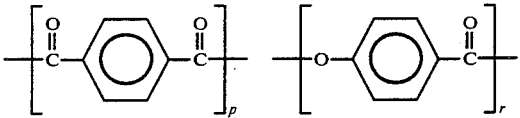

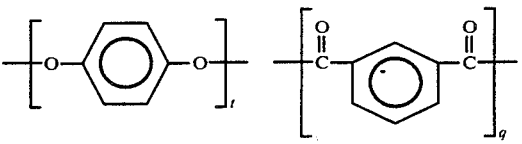

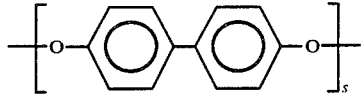

Where; p=0 to 0.9, q=0.1 to 1.00, r=1 to 7, s=0.3 to 1.00, and t=0 to 0.7 and a different aromatic oxybenzoyl polyester.

11. A composition according to claim 10 wherein the ratio of the units in claim 8 is p=0, q=1.0, r=1 to 7 and s=1.0.

12. A composition according to claim 10 wherein the flow modifier is present in an amount of from about 1% to about 20%.

13. A composition according to claim 12 wherein the flow modifier is present in an amount of from about 2% to about 10%.

14. A composition according to claim 10 wherein the aromatic oxybenzoyl polyester is a polyester prepared by the reaction of terephthalic acid, p-hydroxybenzoic acid and biphenol.

15. A composition according to claim 10 wherein the aromatic oxybenzoyl polyester flow modifier is a polyester prepared by the reaction of isophthalic acid p-hydroxybenzoic acid and biphenol.

16. A composition according to claim 10 wherein the aromatic oxybenzoyl polyester is a polyester prepared by the reaction of a mixture of isophthalic and terephthalic acids, p-hydroxybenzoic acid and biphenol.

17. A composition according to claim 14 wherein the terephthalic acid, p-hydroxybenzoic acid and biphenol are present in the respective ratios of 1:0.1:1 to 1:15:1.

18. A composition according to claim 14 wherein the terephthalic acid, p-hydroxybenzoic acid and biphenol are present in the ratio of 1:2:1.

19. The process of claim 5 wherein the aromatic oxybenzoyl polyester flow modifier is a polyester prepared by the reaction of isophthalic acid, p-hydroxybenzoic acid and biphenol.

20. A composition according to claim 14 wherein the aromatic oxybenzoyl polyester flow modifier is a polyester prepared by the reaction of isophthalic acid, p-hydroxybenzoic acid and biphenol.

* * * * *